F. J. OAKES.
CHAIN.
APPLICATION FILED JUNE 1, 1921.
1,419,891.
Patented June 13, 1922.
2 SHEETS—SHEET 1.
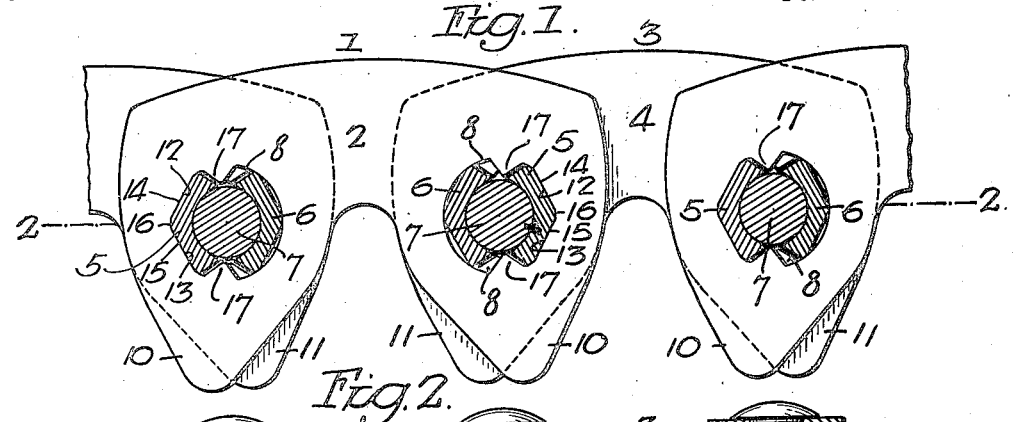
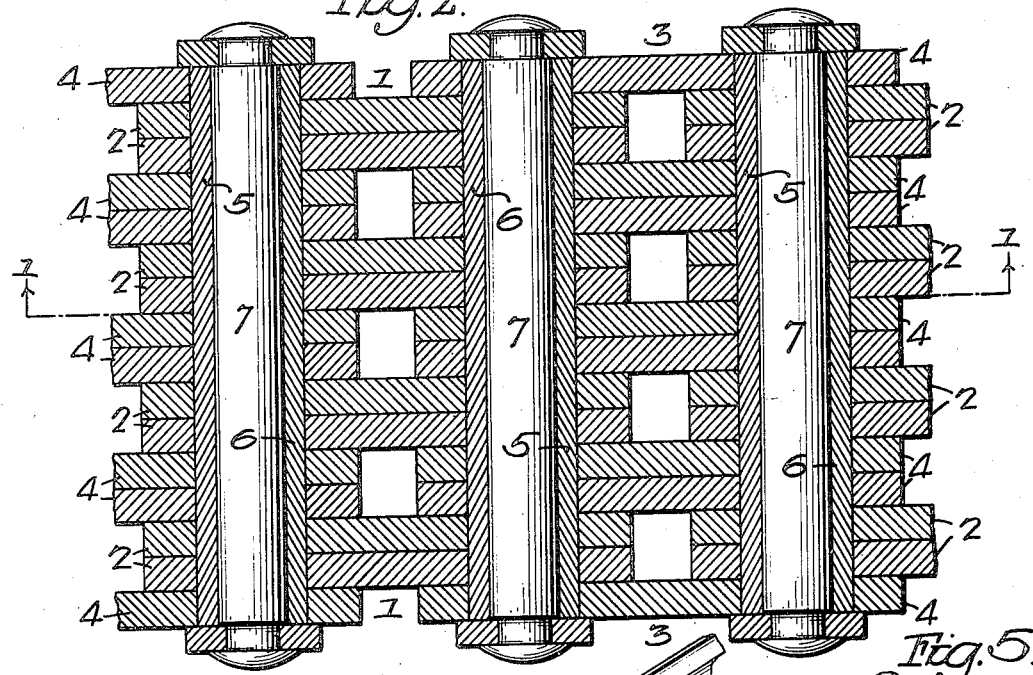
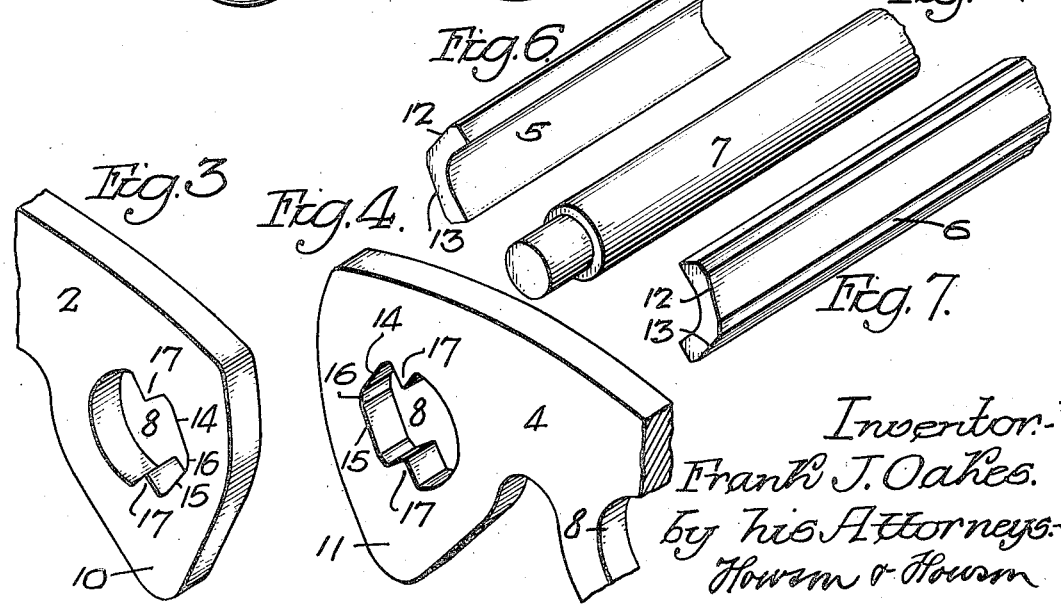
Inventor:
Frank J. Oakes.
by his Attorneys.
Howson & Howson

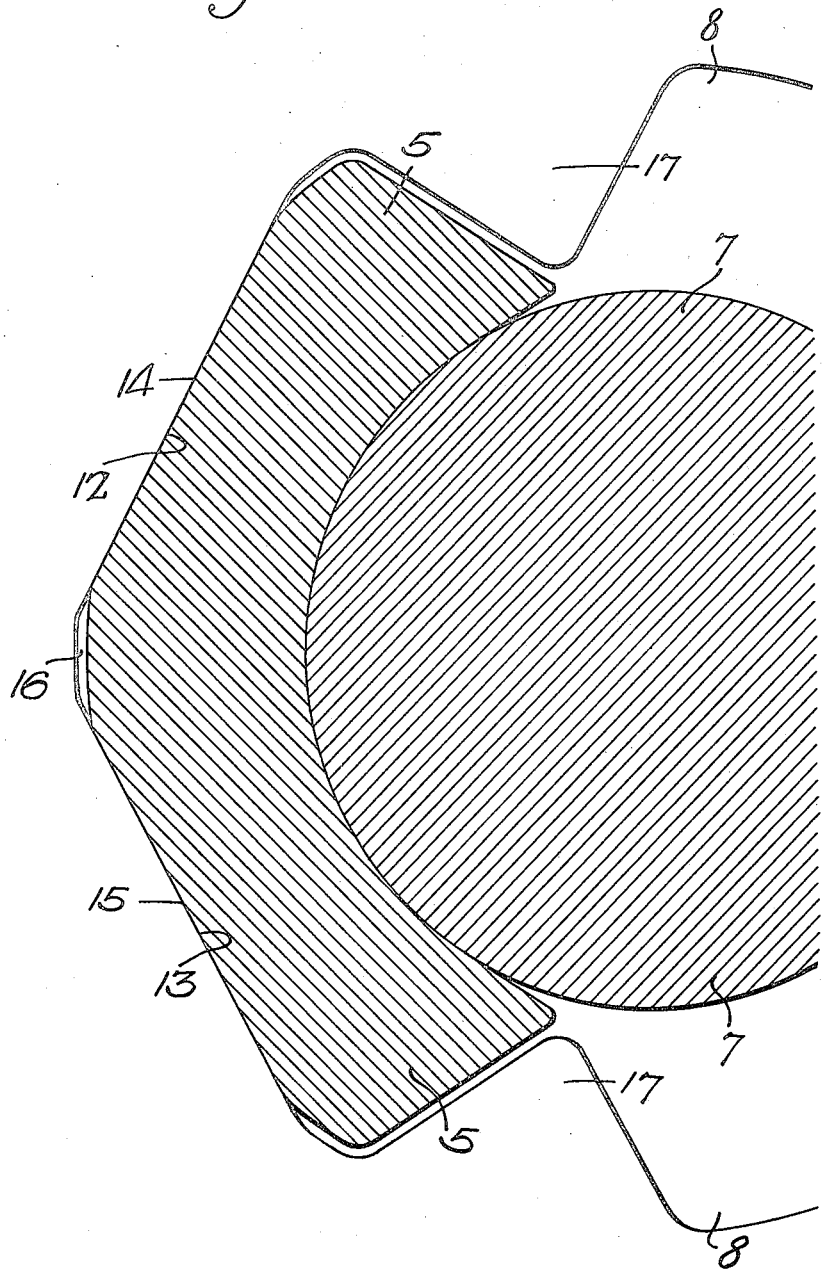

UNITED STATES PATENT OFFICE.

FRANK J. OAKES, OF INDIANAPOLIS, INDIANA, ASSIGNOR TO LINK-BELT COMPANY, OF CHICAGO, ILLINOIS, A CORPORATION OF ILLINOIS.

CHAIN.

1,419,891.  Specification of Letters Patent.  Patented June 13, 1922.

Application filed June 1, 1921. Serial No. 474,073.

*To all whom it may concern:*

Be it known that I, FRANK J. OAKES, a citizen of the United States, residing in Indianapolis, Indiana, have invented certain Improvements in Chains, of which the following is a specification.

My invention relates to certain improvements in drive chains of the type in which the links consist of a series of sections, the sections of one link being coupled to those of another link by a pintle and bushings, one bushing being connected to the sections of one link and the other bushing being connected to the sections of the other link.

Heretofore, in the manufacture of chains of this type the seats in the several link sections for the bushings were curved. This construction allowed a certain amount of rotary movement of the bushings in their seats, causing, in time, a loose fit between the parts.

The object of my invention is to provide means for holding the bushings in the links so that they will be rigid under stress. This object I attain by making the back of each bushing in the form of a wedge, which fits a complementary surface in the link, or link sections.

In the accompanying drawings: Fig. 1 is a longitudinal sectional view of a drive chain of the silent type, the section being on the line 1—1, Fig. 2; Fig. 2 is a sectional plan view on the line 2—2, Fig. 1; Figs. 3 and 4 are detached perspective views of two link sections; Fig. 5 is a detached perspective view of a part of one of the pintles; Figs. 6 and 7 are views of parts of the bushings; and Fig. 8 is a diagrammatic view, drawn to an enlarged scale, illustrating a bushing and its relation to the pintle and link section.

Referring to the drawings, 1 is a link consisting of a series of link sections 2. 3 is a link consisting of a series of link sections 4. The link sections are arranged in pairs. The pairs of the sections of one link alternate with those of the other link, as clearly shown in Fig. 2. 7 are the pintles extending from one side of the chain to the other. On one side of each pintle is a bushing 5 and on the opposite side is a bushing 6. Each of these bushings passes through openings 8 in the link sections 2 and 4, the bushing 5 being held from turning in the link sections 2, but free to turn in the link sections 4, while the bushings 6 are held from turning in the link sections 4, but are free to turn in the link sections 2.

Washers 9 are secured to each end of the pintle 7, the pintles being riveted over the washers, as clearly shown in Fig. 2, so that the sections of the chain are held in proper relation. In the present instance, each of the link sections 2 has two teeth 10 and the sections 4 have two teeth 11. These teeth are spaced apart and are shaped to conform to the shape of the teeth of the sprocket wheels around which the chain passes, but it will be understood that the invention can be used with other types of chains without departing from the essential features of the invention.

The back of each bushing has flat surfaces 12 and 13, Fig. 8. These surfaces are at an angle to the longitudinal line through the links of the chain and fit against corresponding surfaces 14 and 15 on the link sections. There is clearance, as at 16, between the intermediate surface of the bushing and the link sections so as to allow for an accurate fit of the surfaces of the bushing against the surfaces of the link sections. Projecting into the openings 8 at each end of the bushings 5 are lugs 17 and projecting at each end of the bushings 6 are lugs 18, which tend to hold the bushings in proper position, but do not, in the present instance, take the bearings of the bushings against the link sections.

By this construction, when the chain is under stress the angular surfaces 12 and 13 of the bushings are forced in contact with the surfaces 14 and 15 of the link sections and the bushings are thus wedged in the recesses in the sections, holding them rigidly in position and against any turning movement with the pintle. While the angular surfaces 12 and 13 are of the same length and are shown at a particular angle, the length of the bushings may vary and the angle may also be varied without departing from the spirit of the invention.

It will be noticed, on referring to Fig. 8, that there is a clearance between the ends of the bushings and the lugs 17 and 18. This obviates the necessity for maintaining close manufacturing limits in finishing the width of the bushings and in punching the pitch holes in the links with close limits between the sides of the lugs. This construction also allows the bushings to be readily placed in the assembled links.

I claim:

1. The combination of two links, each having a pivot opening therein; a bushing mounted in each link; and a pivot pin located between the bushings, each bushing having two flat surfaces, one at an angle to the other, bearing against corresponding surfaces in their respective links in order to prevent a rotary movement of the bushing in its link.

2. The combination in a chain, of two links, each consisting of a series of link sections, the sections of one link being interspersed with those of an adjoining link, each link having pintle and bushing openings; and a pintle and two bushings passing through the several sections of the two links, each bushing having two flat surfaces, one surface being at an angle to the other, the link sections of respective bushings having corresponding surfaces so that when the chain is under stress the wedging action of the bushings against the surface of the link sections will hold the bushings from turning in their respective links.

3. The combination in a chain, of two links, each link having an opening for a pintle and two bushings, one link being held against rotation in the opening and the other being free to rotate a given distance, the fixed bushing having a wedge-shaped bearing against the link, which prevents rotation of the bushing in the link.

4. The combination in a silent chain, of two series of links, one alternating with the other, each link consisting of a series of sections, the sections being arranged in pairs and extending from one side of the chain to the other, each link section having an opening at each end for the passage of a pintle and two bushings, the opening at one side being of a width to allow one of the bushings free rotary movement, the other bushing having angular surfaces forming a wedge fitting the corresponding angular surfaces in the link sections, preventing the rotation of the bushing.

FRANK J. OAKES.